(12) United States Patent
Shastri et al.

(10) Patent No.: US 11,886,013 B2
(45) Date of Patent: Jan. 30, 2024

(54) PASSIVELY-ALIGNED FIBER ARRAY TO WAVEGUIDE CONFIGURATION

(71) Applicant: Aayuna Inc., Allentown, PA (US)

(72) Inventors: Kalpendu Shastri, Orefield, PA (US); Anujit Shastri, San Francisco, CA (US); Soham Pathak, Allentown, PA (US); Bipin D. Dama, Bridgewater, NJ (US); Alan Leonhartsberger, Kempton, PA (US); Rutvij Dave, Allentown, PA (US); Rao Yelamarty, Allentown, PA (US)

(73) Assignee: Aayuna Inc., Allentown, PA (US)

( * ) Notice: Subject to any disclaimer, the term of this patent is extended or adjusted under 35 U.S.C. 154(b) by 0 days.

(21) Appl. No.: 17/619,451

(22) PCT Filed: Jun. 12, 2020

(86) PCT No.: PCT/US2020/037602
§ 371 (c)(1),
(2) Date: Dec. 15, 2021

(87) PCT Pub. No.: WO2020/257080
PCT Pub. Date: Dec. 24, 2020

(65) Prior Publication Data
US 2022/0244474 A1     Aug. 4, 2022

Related U.S. Application Data

(60) Provisional application No. 62/862,199, filed on Jun. 17, 2019.

(51) Int. Cl.
*G02B 6/30*     (2006.01)
*G02B 6/36*     (2006.01)
(Continued)

(52) U.S. Cl.
CPC .............. *G02B 6/30* (2013.01); *G02B 6/3636* (2013.01); *G02B 6/3692* (2013.01);
(Continued)

(58) Field of Classification Search
CPC ...... G02B 6/30; G02B 6/3652; G02B 6/3636; G02B 6/423; G02B 6/3692; G02B 6/4243;
(Continued)

(56) References Cited

U.S. PATENT DOCUMENTS 4,639,074 A * 1/1987 Murphy .................... G02B 6/30
    385/52
4,725,114 A * 2/1988 Murphy ............... G02B 6/2826
    385/59
(Continued)

FOREIGN PATENT DOCUMENTS

EP     532470 B1 * 5/1997 ............... G02B 6/30
EP    1168011 A1 * 1/2002 ............... G02B 6/26
(Continued)

*Primary Examiner* — Michelle R Connelly
(74) *Attorney, Agent, or Firm* — Wendy W. Koba (57) ABSTRACT

Passive alignment and connection between a fiber array and a plurality of optical waveguides terminating along an edge of a photonic IC is provided by a controlled mating between V-grooves formed in a fiber support substrate and alignment ridges formed to surround waveguide terminations along an edge of a photonic IC. The V-grooves of the fiber support substrate are spaced to define the same pitch as the waveguides on the photonic IC, with the height and width of the alignment ridges formed to engage with the V-grooves upon mating of the fiber support substrate with the photonic IC. The individual fibers are positioned within associated V-grooves such that their endfaces are retracted from a
(Continued)

proximal end portion of the support structure. It is this proximal end portion that mates with the alignment ridges on the photonic IC.

7 Claims, 9 Drawing Sheets

(51) Int. Cl.
  *G02B 6/42* (2006.01)
  *G02B 6/136* (2006.01)
  *G02B 6/12* (2006.01)

(52) U.S. Cl.
  CPC ............ *G02B 6/4228* (2013.01); *G02B 6/136* (2013.01); *G02B 2006/12097* (2013.01)

(58) Field of Classification Search
  CPC ................ G02B 6/4228; G02B 6/136; G02B 2006/12097
  See application file for complete search history.

(56) References Cited

U.S. PATENT DOCUMENTS

| | | | |
|---|---|---|---|
| 6,118,917 A | | 9/2000 | Lee et al. |
| 6,157,759 A | | 12/2000 | Seo et al. |
| 6,160,936 A | * | 12/2000 | You .......................... G02B 6/30 |
| | | | 385/52 |
| 6,394,663 B2 | * | 5/2002 | Nakagawa ............... G02B 6/30 |
| | | | 385/86 |
| 6,957,004 B2 | | 10/2005 | Richard et al. |
| 9,217,836 B2 | | 12/2015 | Asghari et al. |
| 10,025,045 B2 | | 7/2018 | Nuttall et al. |
| 10,048,455 B2 | | 8/2018 | Pfnuer |
| 10,288,812 B1 | | 5/2019 | Evans et al. |
| 10,656,339 B2 | * | 5/2020 | Patel .................... G02B 6/4239 |
| 2003/0206707 A1 | | 11/2003 | Richard et al. |
| 2006/0110106 A1 | | 5/2006 | Tsai et al. |
| 2006/0193560 A1 | | 8/2006 | Yang et al. |
| 2017/0351031 A1 | | 12/2017 | Shastri et al. |
| 2019/0086618 A1 | | 3/2019 | Shastri et al. |
| 2019/0250335 A1 | | 8/2019 | Kulick et al. |
| 2020/0003955 A1 | | 1/2020 | Kulick et al. |

FOREIGN PATENT DOCUMENTS

| | | | | |
|---|---|---|---|---|
| GB | 2 195 785 | | 4/1988 | |
| GB | 2219414 A | * | 12/1989 | ............ G02B 6/2821 |

* cited by examiner

PASSIVELY-ALIGNED FIBER ARRAY TO WAVEGUIDE CONFIGURATION

CROSS-REFERENCE TO RELATED APPLICATIONS

This application claims priority from U.S. Provisional Application No. 62/862,199, filed Jun. 17, 2019 and herein incorporated by reference.

TECHNICAL FIELD

The present invention relates to optical systems and, more particularly, to providing passively aligned interconnections between optical fiber arrays and waveguides formed within photonic integrated circuits.

BACKGROUND OF THE INVENTION

In the creation of optical-based communication systems, there is a continual need to connect optical fibers with photonic integrated circuits. The interconnection can be difficult and tedious, and may require the alignment of tens of individual fibers to a single photonic IC, with little or no room to maneuver multiple fibers in close proximity to the IC.

In most cases, the core region of each optical fiber needs to be aligned with an associated waveguide (or light emitting/receiving device) with a tolerance on the order of ±1-2 μm. While active alignment processes are available, they require a technician to measure the power coupled between a fiber and its associated signal path on the photonic IC, and define "alignment" when a maximum coupling is achieved. This active alignment process must then be repeated for each individual fiber. Dedicated equipment is required for the active alignment process that uses a sub-micron resolution multi-stage axis system with integrated cameras to control the positioning of the fiber core with respect to the waveguide so as to provide optical alignment between the components. Not only is the active alignment equipment expensive, but the active alignment process itself slows down the assembly process and limits throughput.

Some alternative solutions use V-grooves that are patterned and etched directly in a silicon-based photonic IC, with the patterning defined to passively align optical fibers positioned in the V-grooves with devices/waveguides of the photonic IC. While considered an improvement over active alignment in many situations, the need to include V-grooves on the photonic IC takes up valuable "real estate" that is better used for actual optical device formation. Moreover, problems remain in terms of controlling the axial alignment of the fibers along the longitudinal extent of the V-grooves, particularly over time where various types of bonding epoxy may slightly change shape and result in shifting the position of the fiber's core region with respect to the optical device/waveguide.

SUMMARY OF THE INVENTION

The needs remaining in the prior art are addressed by the present invention, which relates to an arrangement for providing passive alignment between a fiber array and a photonic IC without requiring the formation of fiber-supporting grooves in the photonic IC itself.

In accordance with the present invention, passive alignment and connection between a fiber array and a plurality of optical waveguides terminating along an edge of a photonic IC is provided by a controlled mating between V-grooves formed in a fiber support substrate and alignment ridges formed to surround waveguide terminations along an edge of a photonic IC. The V-grooves of the fiber support substrate are spaced to define the same pitch as the waveguides on the photonic IC, with the width of the alignment ridges formed to engage with the V-grooves upon mating of the fiber support substrate with the photonic IC.

The individual fibers are positioned within associated V-grooves such that their endfaces are positioned at an interior location along the V-grooves (i.e., retracted from the endface of the V-grooves). In this manner and in accordance with the configuration of the present invention, a defined proximal end portion of the V-grooves remains vacant. It is this proximal end portion that mates with the alignment ridges on the photonic IC to provide passive alignment between the fibers (as supported along the remaining portion of the V-grooves) and the waveguides that terminate within the alignment ridges.

It is an aspect of the present invention that the alignment ridge dimensions are controlled such that the mating surface (i.e., a "top" surface) of the fiber support substrate remains spaced apart from the mating surface of the photonic IC, ensuring that the passive optical alignment based on these parameters is not otherwise compromised by complete physical contact across the top major surfaces of the two components.

In certain embodiments of the present invention, additional alignment fiducials may be formed beyond the extent of the array end terminations, with the ability to form larger areas where bonding material may be positioned to strengthen the physical attachment between the components.

The configuration of the present invention is useful with any type of photonic integrated circuit, such as silicon PICs, polymer PICs, and the like. The specific material compositions of the waveguides, fibers, and their associated dimensions are all factors that are taken into consideration when determining the specific dimensions of the alignment ridges and fiber-supporting V-grooves.

An exemplary embodiment of the present invention takes the form of an interconnection arrangement providing passive alignment between an array of optical fibers and an array of optical waveguides integrated within an optical substrate, where the passive alignment is provided by a plurality of alignment ridges formed to engage with a plurality of V-grooves to passively align waveguides (within the ridges) to optical fibers (supported within the V-grooves). The plurality of alignment ridges is disposed to surround individual optical waveguides forming the array of optical waveguides, with the array of optical waveguides formed to exhibit a predetermined pitch between adjacent optical waveguides within the array. An optical fiber array support structure is configured to include a plurality of V-grooves for supporting the array of optical fibers and providing passive alignment with the plurality of alignment ridges. The plurality of V-grooves is formed to exhibit the same predetermined pitch as the waveguides, and includes a first portion for supporting the array of optical fibers and a second portion, defined as a proximal end portion, beyond an end termination of the array of optical fibers. The proximal end portion uses the V-grooves as alignment features that engage with the plurality of alignment ridges to provide passive alignment between the array of optical fibers and the array of optical waveguides.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
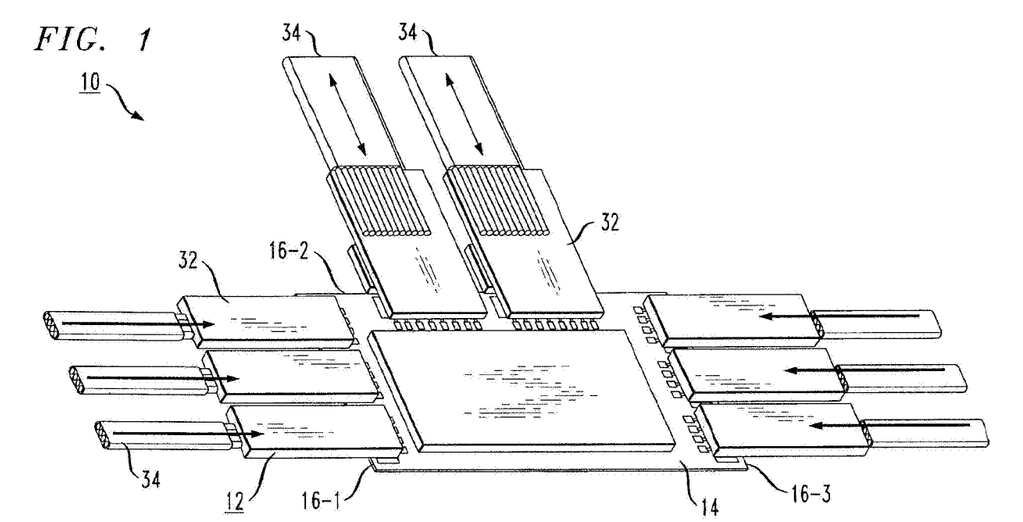
FIG. 1 depicts an exemplary interconnection arrangement between fiber arrays and a photonic integrated circuit (PIC) having waveguide arrays that terminate along one or more sidewalls of the PIC substrate.

FIG. 1 depicts an exemplary interconnection arrangement between various fiber arrays and a photonic integrated circuit including optical waveguides that are to be connected to these arrays. In the case of optical systems, connection between waveguides and fiber arrays is defined by providing optimum coupling of optical energy between a core region of an optical fiber and an optical waveguide, where both of these elements have a size on the order of less than 10 µm, and require an alignment tolerance on the order of ±1-2 µm. As mentioned above, active coupling between a fiber and a waveguide may be performed on an individual basis, but in many of today's photonic integrated circuit configurations such as that illustrated in FIG. 1, there are likely to be multiple arrays of fibers to be connected, with many arrays consisting of a group of twelve fibers.

The present invention proposes a passive alignment configuration that allows for a fiber array to be automatically aligned with its associated waveguide array upon attachment of the array's support structure to the PIC including the waveguide array. As will be described in detail below, an array of alignment ridges is formed to surround the waveguides using standard semiconductor fabrication pattern and etching processes, where the width of the alignment ridges are specifically designed to engage with the "vacant" proximal end portion of the fiber array V-groove structure such that passive fiber-to-waveguide alignment is achieved when the fiber array is mounted in "flip-chip" fashion over the ridges.

Turning now to FIG. 1, optical arrangement 10 is shown as having several optical fiber array support structures 12 that are to be coupled to optical waveguides (not shown) formed within a PIC 14, where the waveguides are formed to terminate along a defined sidewall 16 of PIC 14. In optical arrangement 10, three different sidewalls 16-1, 16-2, and 16-3 of PIC 14 are configured to support waveguides and alignment ridges. Obviously, this is only one example and various other arrangements may use all four sidewalls, only a single sidewall, etc. In the general illustration of FIG. 1, arrangement 10 is shown as providing interconnection between waveguide arrays of different dimensions and fiber arrays appropriately sized to support these waveguide arrays. Common examples are based upon the use of twelve-fiber array and four-fiber array configurations. The "upside-down" connection of fiber array support structures 12 around the periphery of PIC 14 is evident in this view.

Figure 2:
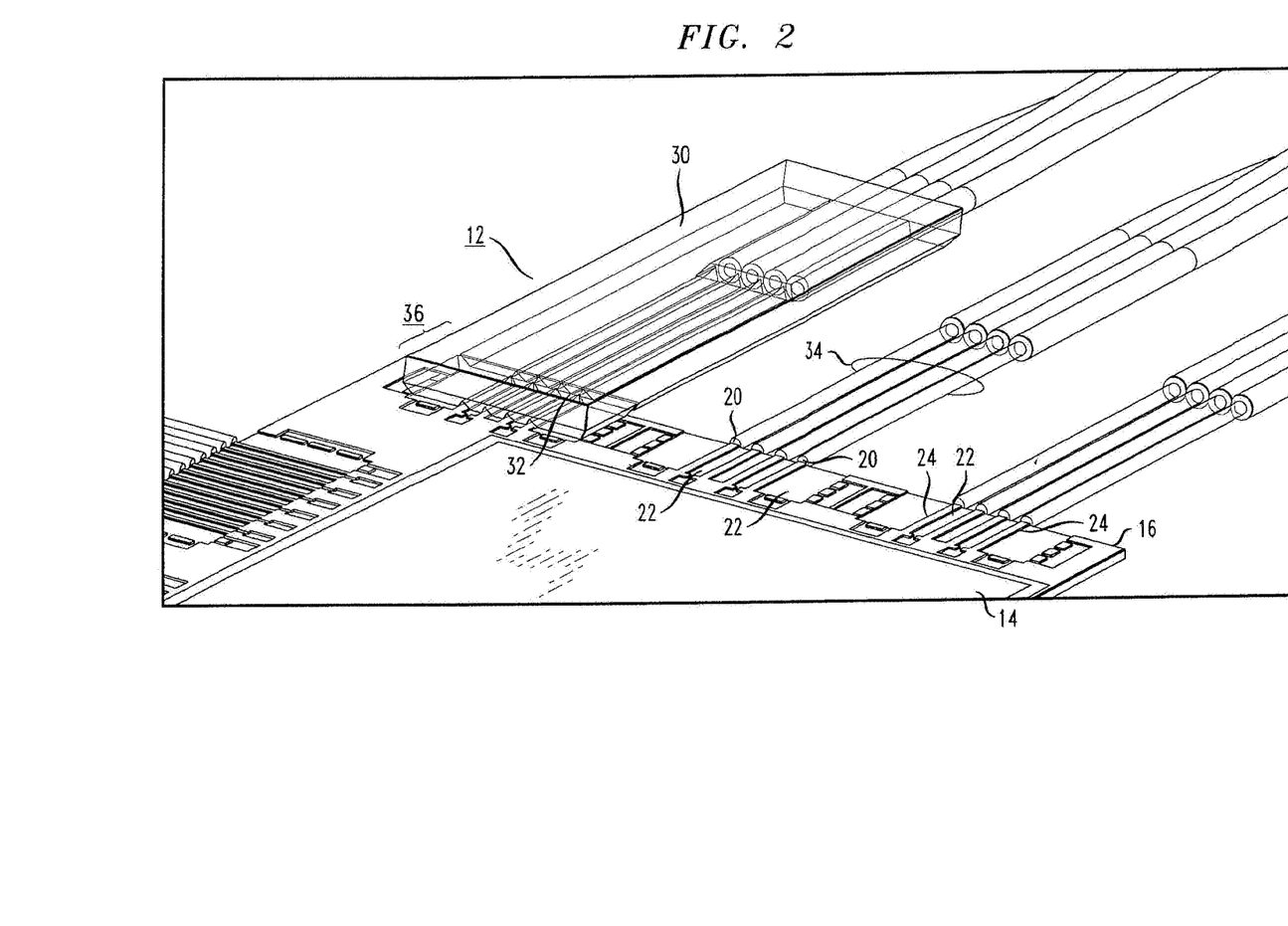
FIG. 2 is an enlargement of a portion of the illustration of FIG. 1, illustrating an exemplary fiber array support structure in engagement with a sidewall of the PIC substrate.

FIG. 2 is an enlargement of a portion of optical arrangement 10, where an exemplary fiber array support structure 12 is shown (in phantom) in engagement and alignment with a sidewall 16 of PIC 14. The details of the formation of the included V-grooves 32 and their engagement with alignment ridges 22 on PIC 14 will be discussed in detail below. Also shown in FIG. 2 is an array of fibers 34 with its support structure 12 being removed, illustrating the aligned position of the core region of each individual fiber 34$i$ with an individual optical waveguide 20, (not particularly illustrated) that is surrounded by an alignment ridge 22$i$. It is this set of alignment ridges 22 that engages with the "vacant" proximal end portion 36 of the fiber array support structure V-grooves 32 to provide passive alignment between fibers and waveguides within the acceptable ±1-2 µm tolerance.

Figure 3:
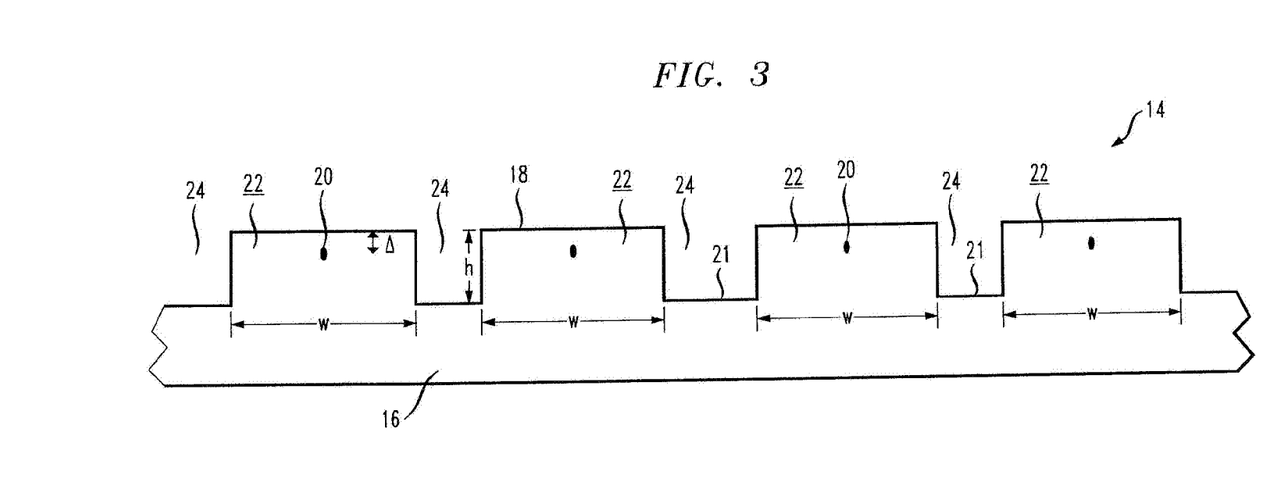
FIG. 3 is a simplified side view of an exemplary PIC configuration, illustrating an array of optical waveguides as terminating along a sidewall of the PIC substrate.
Figure 4:
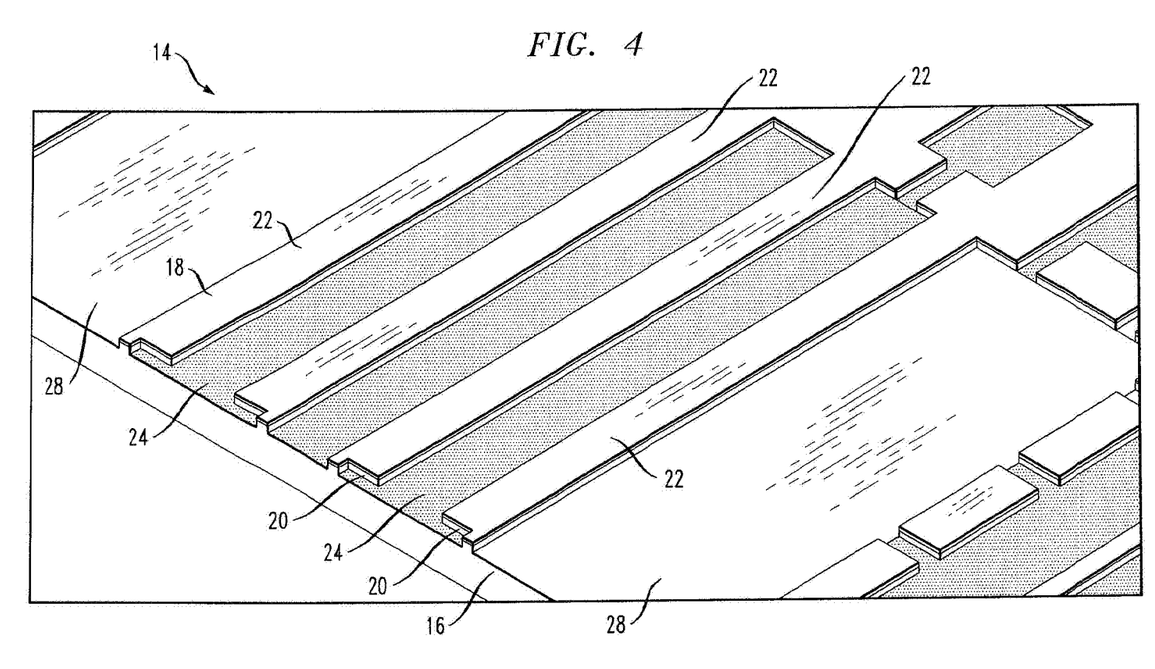
FIG. 4 is an isometric rendering of the side view of FIG. 3.

FIG. 3 is a simplified illustration of a side view of PIC 14, showing an array of optical waveguides 20 terminating along sidewall 16, with a plurality of alignment ridges 22 specifically formed to surround waveguides 20. FIG. 4 is an isometric rendering of a similar portion of PIC 14. In the particular configuration of FIGS. 3 and 4, an array of four waveguides 20 is shown as contained within an associated array of ridges 22.

In accordance with the teachings of the present invention, the alignment ridge structure is formed by using well-known integrated circuit fabrication techniques to remove portions of the PIC substrate material between adjacent waveguides 20. That is, a top surface 18 of PIC 14 is processed (patterned and etched) to form a series of trenches 24 that result in creating alignment ridges 22 of specified dimensions (in terms of at least width "w") as will be discussed below. The positioning of waveguide array 20 below top surface 18 is previously defined during the course of forming the waveguides in the first instance. In an exemplary waveguide fabrication process, waveguide array 20 may be disposed a distance A of about 5 µm below surface 18 (this is only one typical example of the spacing). As a result of the additional processing of the present invention to form alignment ridges, each waveguide 20 is now not only positioned at a predetermined depth "d" from top surface 18 of silicon PIC 14, but is also centered within the etch-defined width "w" of its associated alignment ridge 22.

An anisotropic process, such as reactive ion etching (RIE) or "deep" RIE (DRIE) may be used in alignment ridge fabrication process to create trenches 24 that define the locations of ridges 22. Importantly, the trench fabrication is controlled such that alignment ridges 22 exhibit a predetermined width w that is required to properly engage with V-grooves 32 in a manner that creates passive alignment between the array of optical fibers (more specifically, the core regions of the optical waveguides) and the array of optical waveguides. It is to be noted that while alignment ridges 22 are shown as having a constant width along their longitudinal extent L, it is also possible to fabricate and utilize alignment rides that taper. In particular, some embodiments may utilize arrangement ridges that become narrower in the direction away from the end portion of PIC 14. Such an arrangement is contemplated to facilitate the initial placement of fiber support structure 12 (as discussed below), with the narrowing providing a further assurance of alignment between the components.

In preferred embodiments of the present invention, the height "h" of alignment ridges 22 (measured from a floor surface 21 of trench 24 to top surface 18 of alignment ridge 22) is selected to ensure that a gap remains between floor surface 21 and the engaging "top" surface of substrate 30. This is best shown in FIG. 3, illustrating the height h of alignment ridge 22 as measured from floor surface 21 of etched trench 24 adjacent to an alignment ridge 22. FIG. 3 specifically shows that in this preferred embodiment, the height h is preferably selected to prevent contact between a top surface 38 of fiber support structure 12 and floor surface 21 of trenches 24, since this contact would result at times as not permitting V-grooves 32 to fully rest in place on alignment ridges 22. This aspect will become clearer below in association with the discussion of FIG. 7.

Figure 5:
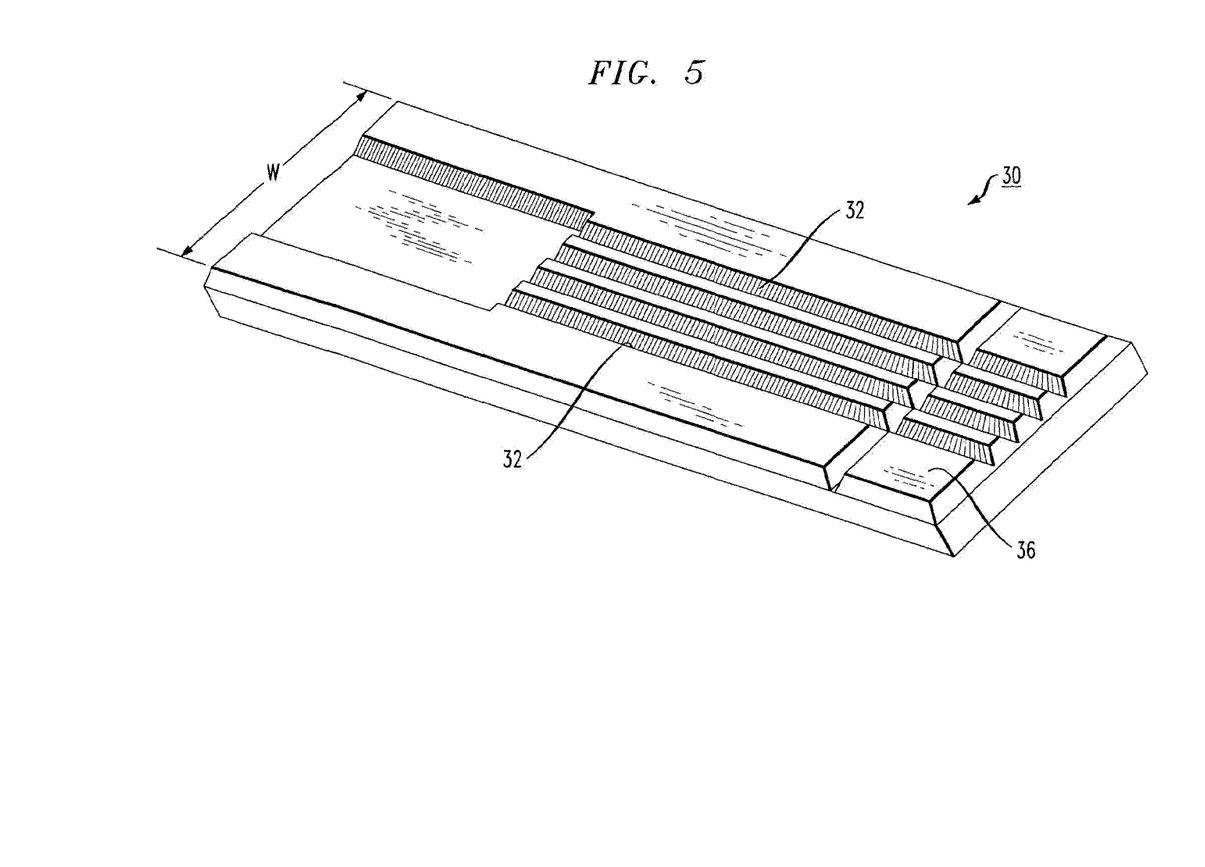
FIG. 5 is an isometric view of an exemplary fiber array support substrate formed in accordance with the principles of the present invention.
Figure 6:
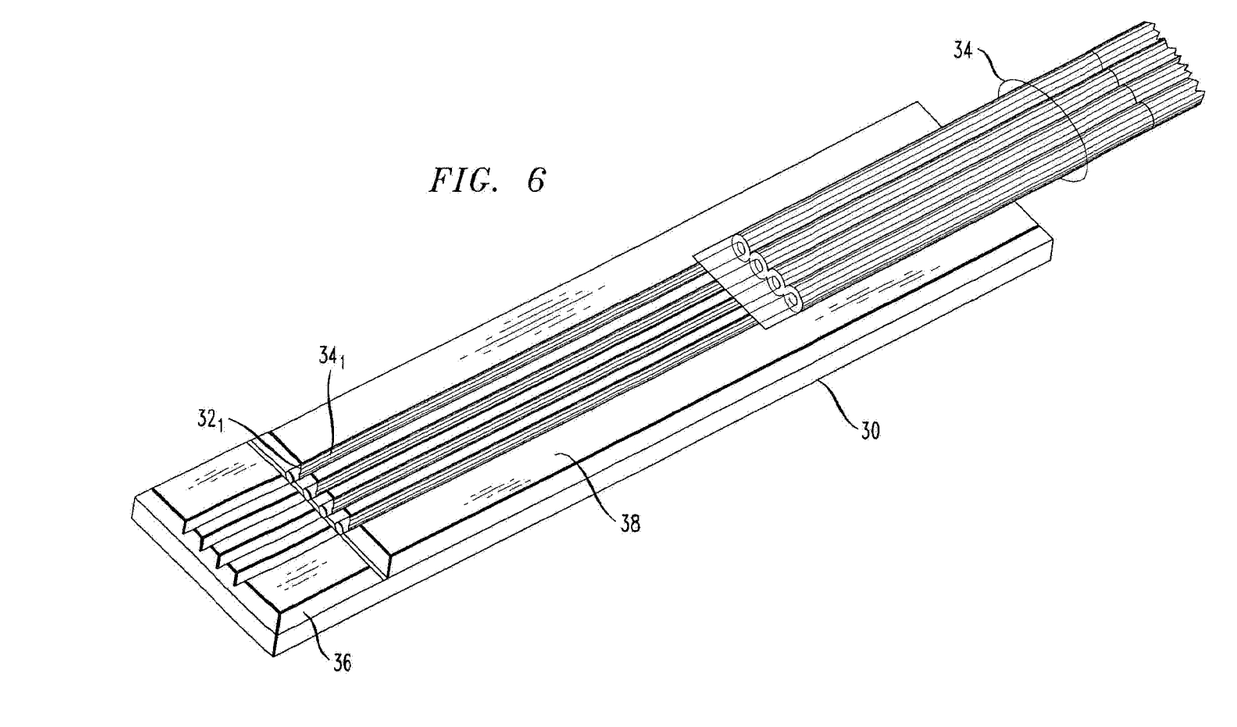
FIG. 6 is another illustration of the substrate of FIG. 5, in this case further illustrating the location of an optical fiber array to clearly show the proximal end portion of the support substrate that remains "empty" and is used as the alignment element for the fibers.

FIG. 5 is an isometric view of an exemplary fiber array substrate member 30, showing in particular a plurality of longitudinally-disposed V-grooves 32 that are formed in a predetermined spaced-apart configuration across the width W of substrate member 30 such that each individual V-groove supports a separate optical fiber. FIG. 6 illustrates a similar substrate 30, with an array of optical fibers 34 disposed within V-grooves 32. As discussed above in association with FIGS. 1 and 2, the complete fiber array substrate structure 12 (which includes other components not relevant to the subject matter of the present invention) is positioned "upside down" over a pre-designated area along an edge portion of PIC 14 that includes the array of waveguides 20 to be coupled to fiber array 34. The dimensions of V-grooves 32 formed within substrate 30 are designed to engage with alignment ridges 22 in the manner defined above when fiber array support structure 12 is placed in position over PIC 14, thereby providing passive alignment between fiber array 34 and waveguide array 20.

In accordance with the principles of the present invention, V-grooves 32 of fiber array support structure 12 are advantageously used for two purposes: (1) to support the associated fiber array 34; and (2) to function as alignment features for mating with alignment ridges 22 associated with waveguide array 20. In order to perform the latter function, the fiber array itself needs to be positioned at a somewhat "retracted" location along V-grooves 32 such that a proximal end portion 36 of substrate member 30 remains vacant and available for use as a passive alignment fixture. End portion 36 of substrate member 30 is shown in both FIGS. 5 and 6, where FIG. 6 in particular illustrates the retracted positioning of fiber array 34 along V-grooves 32 so that end portion 36 remains vacant. By virtue of using the same V-grooves for both of these functions (fiber support and alignment), in combination with the formation of alignment ridges around the individual optical waveguides, the configuration of the present invention is able to provide efficient and repeatable passive alignment between fiber arrays and waveguide arrays of any desired dimension.

Figure 7:
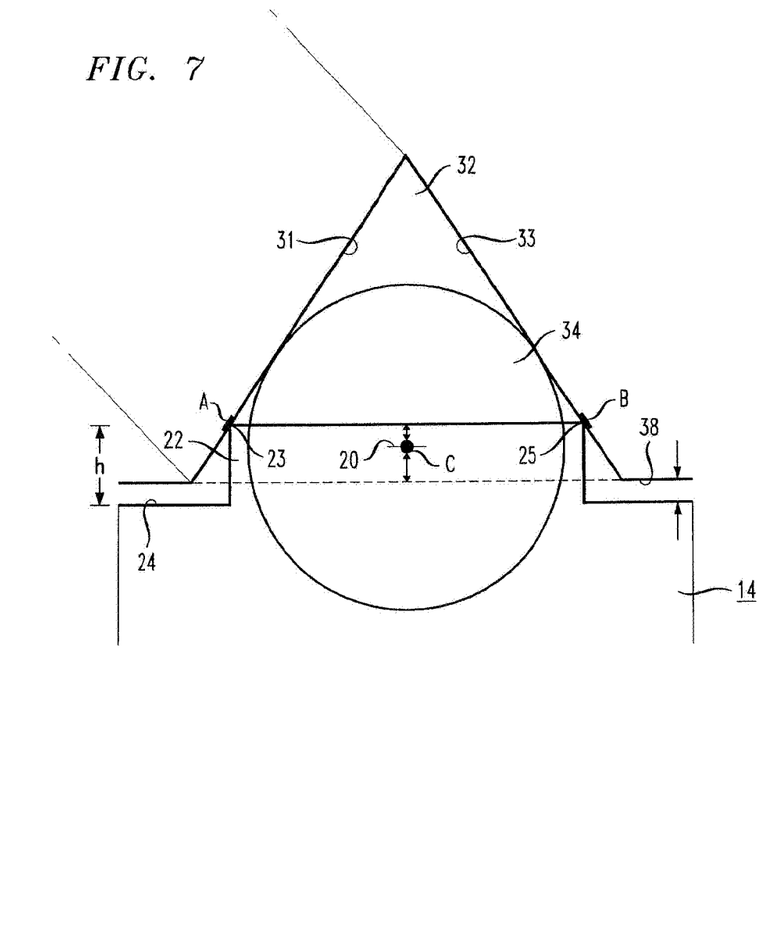
FIG. 7 is a diagram showing the relationship between the parameters of an individual V-groove and alignment ridge so that passive alignment between a core region of an optical fiber and an optical waveguide within the ridge is achieved.

FIG. 7 is a diagram showing the relationship between the parameters of an individual V-groove 32 and individual alignment ridge 22 that is utilized to provide passive alignment between the core region C of optical fiber 34 and optical waveguide 20 of silicon PIC 14. In particular, that alignment is achieved by selecting the width w of alignment ridge 22 such that top corner edges 23, 25 of ridge 22 contact inner sidewalls 31, 33 of V-groove 32 at locations A, B, which brings core region C of optical fiber 34 into alignment with waveguide 20 of PIC 14.

Thus, in accordance with the teachings of the present invention, by virtue of the ability to define the width w of alignment ridge 22 with sub-micron precision, and knowing the position A of waveguide 20 with respect to top surface 18 of alignment ridge 22, V-groove 32 may be formed to engage with side edges 23, 25 of ridge 22 at the precise location (here, points A, B) that provide alignment of the core region C of optical fiber 34 with waveguide 20. As a result of these pre-configured, corresponding dimensions of V-grooves 32 and the width w of alignment ridges 22, optical alignment between fiber core C and waveguide 20 is achieved "passively", meaning that when fiber array structure 12 is physically mated with silicon PIC 14, V-grooves 32 automatically engage with ridges 22, providing optical alignment with a sub-micron tolerance.

As discussed above, preferred embodiments of the present invention form ridges 22 not only to have the requisite width w to provide optical alignment, but also to have a height h that is at least tall enough to prevent top surface 38 of fiber substrate member 30 from coming into physical contact with floor surface 21 of trench 24 adjacent to alignment ridge 22. It is an aspect of the present invention that by preventing physical contact between fiber array support structure 12 and silicon PIC 14 in this manner, it is assured that alignment between an individual fiber core and its associated waveguide is based solely on the controllable parameters of the width w of alignment ridge 22 and the dimensions of V-groove 32.

Advantageously, conventional integrated circuit fabrication processes may be used to form ridges 22 by creating trenches 24 to have a depth that provides ridge height h with the preferred few-micron tolerance level. In some embodiments, a pair of outer trenches 28 may also formed, and used to bond the outer sides of fiber array support structure 12 to silicon PIC 14 (outer trenches shown explicitly in FIG. 4). Indeed, the etched structure as shown in FIGS. 2 and 4 also show various paths and locations for directing the flow of index-matching epoxy that is used to permanently bond fiber array support structure 12 to silicon PIC 14.

In one exemplary embodiment where silicon PIC 14 has a thickness of 100 μm, the height h of an alignment ridge 22 may be on the order of about 25 μm (±5 μm). This value is considered to be exemplary only. The spacing between adjacent ridges 22 is designed as a function of the pitch P between adjacent waveguides 20. Accordingly, the array of V-grooves 32 is necessarily spaced so that supported fibers 34 exhibit the same pitch as waveguides 20. Depending on the specific type of fibers supported in the array (e.g., single mode fiber, PM fiber, reduced-cladding fiber, etc.), the pitch P may be different. Thus, the pattern used to define the etching step is adjusted, as necessary, when the pitch P is modified.

PIC 14 is preferably patterned and etched using known techniques to simultaneously form all of the desired trench patterns at each specific location around its periphery.

Indeed, the process of forming passive alignment ridges 22 may be part of a wafer-scale process where a large number of PICs are fabricated at the same time. One preferable technique for forming ridges 22 is a deep reactive ion etch (DRIE) technique, which is able to quickly remove appreciable depths of material. However, other techniques are possible. Indeed, any process capable of forming the trenches with the necessary accuracy (e.g., ±1-2 μm tolerance on the width w of alignment ridge 22) may be used in accordance with the present invention.

Figure 8:
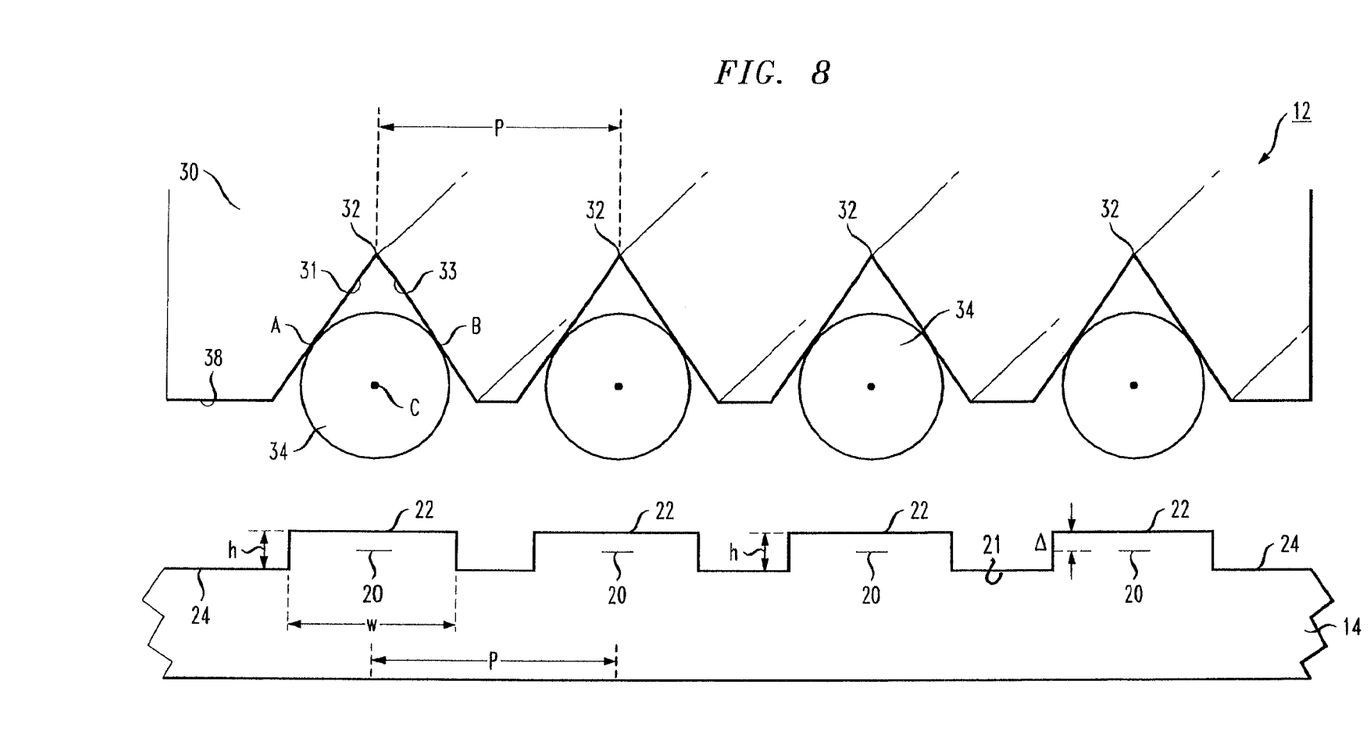
FIG. 8 is a diagram showing a side view of an exemplary fiber array support substrate as positioned over the area of the PIC substrate that includes the alignment ridges.

FIG. 8 is a diagram showing a side view of fiber array support structure 12 in position over (but not yet engaged with) silicon PIC 14. Clearly shown in this view is substrate member 30, including the location of a set of four V-grooves 32 in position over the locations of an associated array of four waveguides 20 as formed within a set of four alignment ridges 22. An array of four optical fibers 34 is shown as positioned within V-grooves 32, where it is to be recalled that fibers 34 are disposed in a somewhat retracted position along V-grooves 32 so that a sufficient end portion 36 of substrate 30 is available to form the cantilevered configuration that provides the actual engagement of the proximal end portions of V-grooves 32 with alignment ridges 22.

Figure 9:
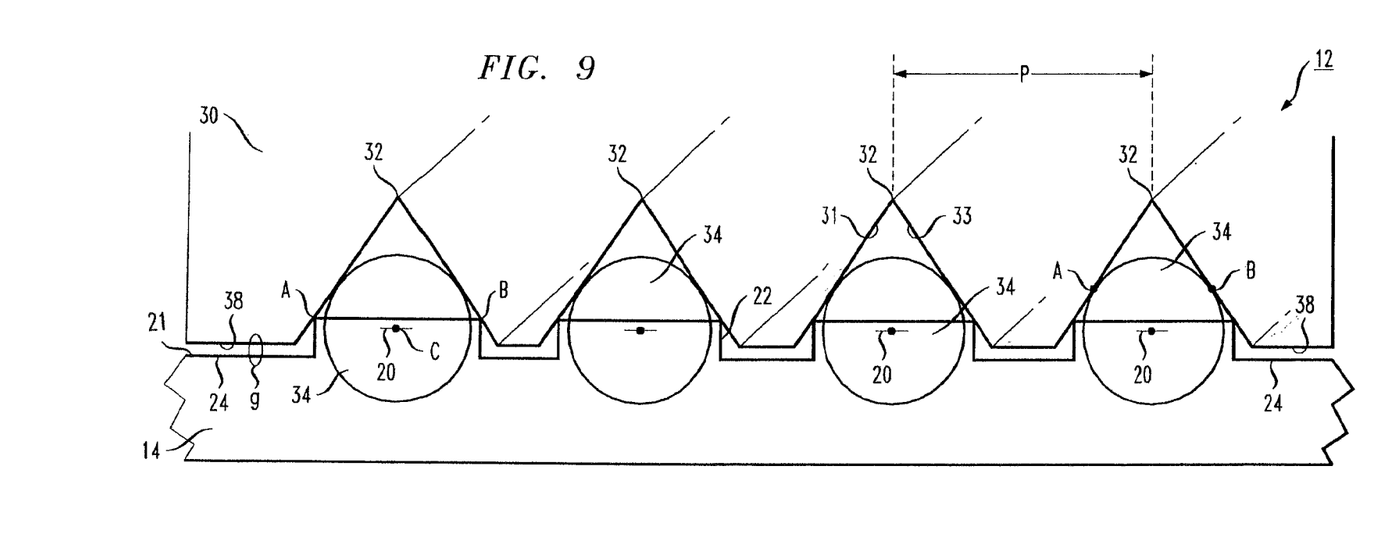
FIG. 9 illustrates the same components as shown in FIG. 8, but in this case subsequent to the mating of the fiber array support substrate with the PIC substrate, providing the desired passive alignment.

FIG. 9 shows the final, aligned form of the assembly, with the "empty" end regions of V-grooves 32 engaged with alignment ridges 22. In accordance with the teachings of the present invention, this combination provides passive alignment between the core regions C of optical fibers 34 and waveguides 20 within alignment ridges 22. In particular, alignment is achieved in accordance with the present invention, by forming ridges 22 to exhibit a width w that will allow for a core region of fiber 34 as supported within V-groove 32 to align with waveguide 20. The pitch P between the core regions of adjacent fibers 34 is shown in FIGS. 8 and 9, where as mentioned above this pitch P is associated with the spacing between adjacent ridges 22 required to accurately and precisely mate with V-grooves 32 and provide passive alignment. Also clearly shown in FIG. 9 is the remaining spacing gap g between the top surface 38 of fiber substrate 30 and trench 24 in silicon PIC 14. As described above, preventing physical contact between the top surface of the fiber array and the silicon PIC ensures that the passive alignment is accurate and not affected by other surfaces coming into contact with one another.

Figure 10:
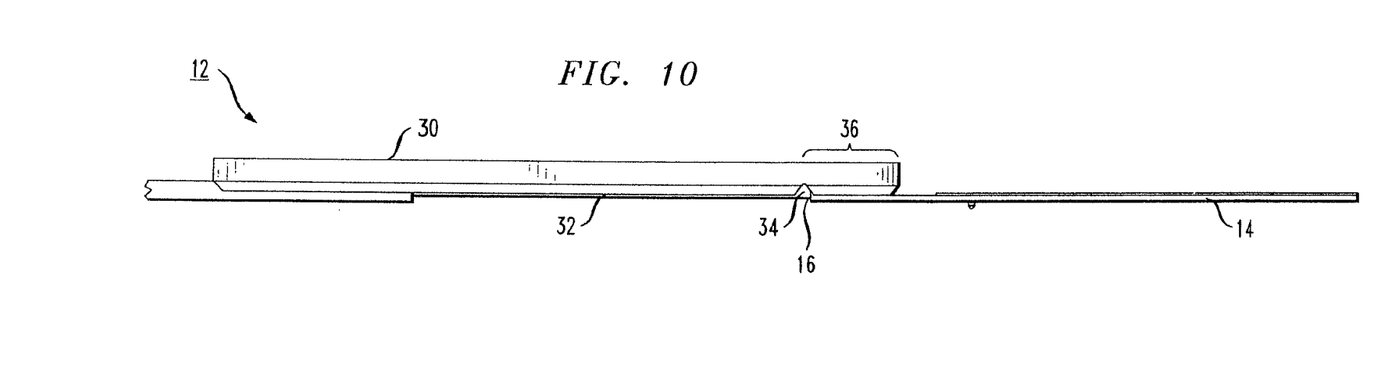
FIG. 10 is a rendering of a side view of the assembly of FIG. 9, showing the position of the endface of the fiber array along a sidewall of the PIC substrate.

FIG. 10 is a rendering of a side view of the assembly, showing the position of the endface of fiber array 34 along sidewall 16 of silicon PIC 14. The proximal end portion 36 of fiber substrate 30 that is used to provide passive alignment is clearly shown as engaged with a peripheral region of PIC 14 that supports waveguides 20 within alignment ridges 22. In some cases, an index-matching epoxy can be used to form a physical bond between the aligned optical fiber 34 and waveguide 22.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the specific configurations as described. Accordingly, many modifications and variations will be apparent to those skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein and defined by the claims appended hereto.

What is claimed is:

1. An interconnection arrangement providing passive alignment between an array of optical fibers and an array of optical waveguides integrated within an optical substrate, the interconnection arrangement comprising:
   a plurality of alignment ridges disposed to surround individual optical waveguides forming the array of optical waveguides, the array of optical waveguides formed to exhibit a predetermined pitch between adjacent optical waveguides within the array, where each alignment ridge exhibits a width w; and
   an optical fiber array support structure comprising a plurality of V-grooves for supporting the array of optical fibers and providing passive alignment with the plurality of alignment ridges, the plurality of V-grooves formed to exhibit the same predetermined pitch, the plurality of V-grooves defined as comprising a first portion for supporting the array of optical fibers and a second portion, defined as a proximal end portion, beyond an end termination of the array of optical fibers, wherein the proximal end portion of the V-grooves functions as alignment features that engage with the plurality of alignment ridges such that a pair of upper corners of each alignment ridge contact inner sidewalls of an associated V-groove at a location that creates alignment between a core region of an associated optical fiber supported within the associated V-groove and the optical waveguide positioned within the alignment ridge so as to provide passive alignment between the array of optical fibers and the array of optical waveguides, wherein the plurality of alignment ridges comprise a height selected to ensure that a gap remains between a top surface of the optical fiber array support structure and an engaging top surface of the optical substrate upon engagement of the plurality of V-groove alignment features with the plurality of alignment ridges.

2. The interconnection arrangement as defined in claim 1 wherein the plurality of alignment ridges further comprises additional alignment and support regions disposed beyond end regions of the plurality of optical waveguides.

3. The interconnection arrangement as defined in claim 1 wherein the plurality of alignment ridges are formed to exhibit individual widths as required for different alignment configurations.

4. The interconnection arrangement as defined in claim 1 wherein the optical substrate comprises a silicon substrate and the alignment ridges are formed by creating trenches extending downward from the top surface of the silicon substrate.

5. The interconnection arrangement as defined in claim 4 wherein the trenches are created by patterning and etching the silicon substrate.

6. The interconnection arrangement as defined in claim 5 wherein the alignment ridges comprise etched features having width tolerances on the order of ±1-2 μms.

7. The interconnection arrangement as defined in claim 1 wherein the arrangement further comprises an index-matching epoxy disposed at the interface between the optical fiber endfaces and the optical waveguide terminations.

* * * * *